US008830792B2

(12) United States Patent
Taylor et al.

(10) Patent No.: US 8,830,792 B2
(45) Date of Patent: Sep. 9, 2014

(54) MOBILE DEVICE LOCALIZATION USING AUDIO SIGNALS

(75) Inventors: Stuart Taylor, Cambridge (GB); Timothy Regan, Cambridge (GB); Philip Gosset, Stroud (GB); Dinan Gunawardena, Cambridge (GB); Eno Thereska, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 662 days.

(21) Appl. No.: 13/089,033

(22) Filed: Apr. 18, 2011

(65) Prior Publication Data

US 2012/0263020 A1 Oct. 18, 2012

(51) Int. Cl.
*G01S 3/80* (2006.01)
*G01S 5/18* (2006.01)

(52) U.S. Cl.
CPC ........................................ *G01S 5/18* (2013.01)
USPC .......................................................... 367/127

(58) Field of Classification Search
USPC .......................................................... 367/127
See application file for complete search history.

(56) References Cited

U.S. PATENT DOCUMENTS

| | | | |
|---|---|---|---|
| 6,157,592 A | 12/2000 | Kriz et al. | |
| 7,039,198 B2 | 5/2006 | Birchfield et al. | |
| 7,869,810 B2 | 1/2011 | Cutler et al. | |
| 2002/0097885 A1* | 7/2002 | Birchfield et al. | 381/92 |
| 2005/0117454 A1 | 6/2005 | Millikin | |
| 2006/0250264 A1* | 11/2006 | Cutler et al. | 340/657 |
| 2009/0195517 A1* | 8/2009 | Duheille et al. | 345/177 |
| 2009/0323472 A1 | 12/2009 | Howe | |
| 2010/0142327 A1* | 6/2010 | Kepesi et al. | 367/124 |

OTHER PUBLICATIONS

Azizyan, et al., "SurroundSense: Mobile Phone Localization via Ambience Fingerprinting", retrieved on Jan. 28, 2011 at <<http://synrg.ee.duke.edu/papers/surroundsense.pdf>>, ACM, Proceedings of Intl Conference on Mobile Computing and Networking (MobiCom), Beijing, China, Sep. 2009, pp. 261-272.

Borriello, et al., "WALRUS: Wireless Acoustic Location with Room-Level Resolution using Ultrasound", retrieved on Jan. 28, 2011 at <<http://www.usenix.org/event/mobisys05/tech/full_papers/borriello/borriello.pdf.ers/MobiSys10Kim.pdf>>, USENIX Association, Proceedings of Intl Conference on Mobile Systems, Applications, and Services (MobiSys), 2005, pp. 191-203.

(Continued)

*Primary Examiner* — Isam Alsomiri
*Assistant Examiner* — James Hulka
(74) *Attorney, Agent, or Firm* — Pablo Tapia; Jim Ross; Micky Minhas

(57) ABSTRACT

Mobile device localization using audio signals is described. In an example, a mobile device is localized by receiving a first audio signal captured by a microphone located at the mobile device and a second audio signal captured from a further microphone. A correlation value between the first audio signal and second audio signal is computed, and this is used to determine whether the mobile device is in proximity to the further microphone. In one example, the mobile device can receive the audio signals from the further microphone and calculate the correlation value. In another example, a server can receive the audio signals from the mobile device and the further microphone and calculate the correlation value. In examples, the further microphone can be a fixed microphone at a predetermined location, or the further microphone can be a microphone located in another mobile device.

20 Claims, 6 Drawing Sheets

(56) References Cited

OTHER PUBLICATIONS

Cano, et al., "A Review of Algorithms for Audio Fingerprinting", IEEE Workshop on Multimedia Signal Processing (MMSP), St. Thomas, Virgin Islands, Dec. 2002, pp. 169-173.

De Marziani, et al., "Simultaneous Measurement of Times-of-Flight and Communications in Acoustic Sensor Networks", retrieved on Jan. 28, 2011 at <<http://ieeexplore.ieee.org/stamp/stamp.jsp?tp=&arnumber=1531644&userType=inst>>, IEEE Proceedings of Intl Symposium on Intelligent Signal Processing (WISP), Faro, Portugal, Sep. 2005, pp. 122-127.

Grigorie, et al., "Bi-Dimensional Position Detection Using TDOA Estimation through Cross Correlation of the Acoustic Signals. Part 1: Theoretical Background", retrieved on Jan. 28, 2011 at <<http://ieeexplore.ieee.org/stamp/stamp.jsp?arnumber=05397336>>, IEEE Intl Conference on ICT and Knowledge Engineering, Bangkok, Thailand, 2009, pp. 28-32.

Hightower, et al., "A Survey and Taxonomy of Location Systems for Ubiquitous Computing", retrieved on Jan. 28, 2011 at <<http://www2.seattle.intel research.net/~jhightower/pubs/hightower2001survey/ hightower2001survey.pdf>>, University of Washington, Department of Computer Science and Engineering, Technical Report UW-CSE Jan. 8, 2003, Aug. 2001, pp. 1-29.

Liu, et al., "Survey of Wireless Indoor Positioning Techniques and Systems", retrieved on Jan. 27, 2011 at <<http://www.sis.pitt.edu/~dtipper/2011/Survey1.pdf>>, IEEE Transactions on Systems, Man, and Cybernetics, Part C: Applications and Reviews, vol. 37, No. 6, Nov. 2007, pp. 1067-1080.

Scott, et al., "Audio Location: Accurate Low-Cost Location Sensing", retrieved on Jan. 28, 2011 at <<http://research.microsoft.com/pubs/64610/audiolocation-pervasive2005.pdf>>, Springer Berlin, Pervasive 2005, vol. 3468, 2005, pp. 1-18.

Wang, et al., "Acoustic Target Tracking Using Tiny Wireless Sensor Devices", retrieved on Jan. 28, 2011 at <<http://reference.kfupm.edu.sa/content/a/c/acoustic_target_tracking_using_tiny_wire_76772.pdf>>, Springer-Verlag Berlin, LNCS 2634, Proceedings of Intl. Conference on Information Processing in Sensor Networks (IPSN), 2003, pp. 642-657.

\* cited by examiner

MOBILE DEVICE LOCALIZATION USING AUDIO SIGNALS

BACKGROUND

Positioning systems and techniques enable the location of devices to be determined and utilized to provide useful services. For example, the global positioning system (GPS) uses signals from a constellation of satellites to localize a receiver to within a few tens of meters. However, whilst systems such as GPS work effectively in open, outdoor environments, they typically do not operate well in indoor environments due to a lack of line-of-sight to the satellites.

Whilst alternative positioning techniques, such as those based on cell site identities can be used indoors, these techniques tend to have a lower accuracy than GPS and are more unpredictable due to uneven radio propagation. As location-based services become more pervasive and useful, it is therefore beneficial to be able to determine the position of a mobile device in indoor environments, without the addition of complex or expensive infrastructure or hardware at the mobile device.

The embodiments described below are not limited to implementations which solve any or all of the disadvantages of known positioning techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Mobile device localization using audio signals is described. In an example, a mobile device is localized by receiving a first audio signal captured by a microphone located at the mobile device and a second audio signal captured from a further microphone. A correlation value between the first audio signal and second audio signal is computed, and this is used to determine whether the mobile device is in proximity to the further microphone. In one example, the mobile device can receive the audio signals from the further microphone and calculate the correlation value. In another example, a server can receive the audio signals from the mobile device and the further microphone and calculate the correlation value. In examples, the further microphone can be a fixed microphone at a predetermined location, or the further microphone can be a microphone located in another mobile device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a mobile computing system, the system described is provided as an example and not a limitation. As those skilled in the art will appreciate, the present examples are suitable for application in a variety of different types of embedded or dedicated systems in which indoor positioning is useful.

Within most indoor environments there exists low level background acoustic noise, in addition to louder acoustic sounds coming from, for example, people, music, TVs, etc. These sounds are often unique to a certain physical space. For example, the sounds present in a kitchen may generally be different from those in a living room. These sounds can therefore be utilized as part of a positioning system to determine which room of an indoor environment a user is located in.

In order to utilize audio signals to determine the position of a user, a mobile device capable of sampling the ambient noise in the area of the user can be used. Many users already possess such a device in the form of a mobile telephone or other portable computing device (such as a laptop computer or tablet device). These devices generally already comprise microphones, and are able to sample audio signals.

Figure 1:
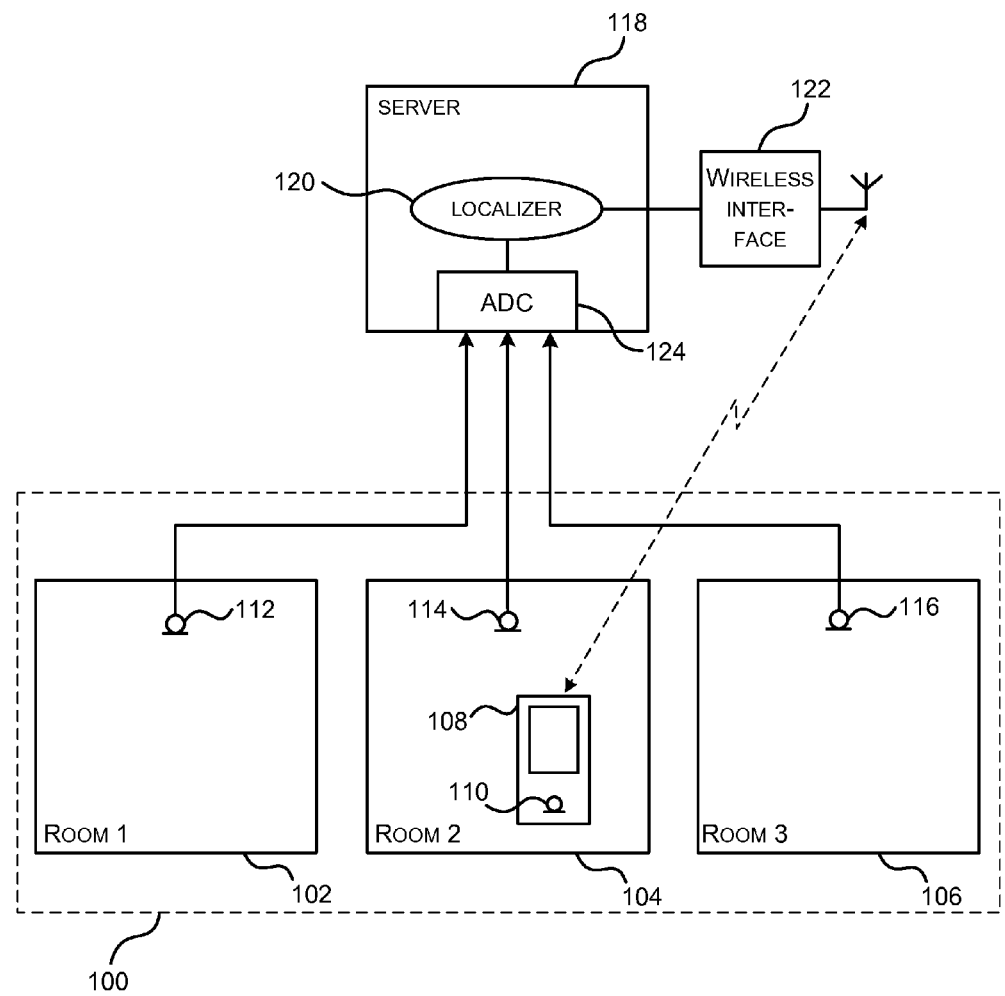
FIG. 1 illustrates a schematic diagram of an indoor positioning system using a central server for location calculation relative to fixed microphones.
Figure 2:
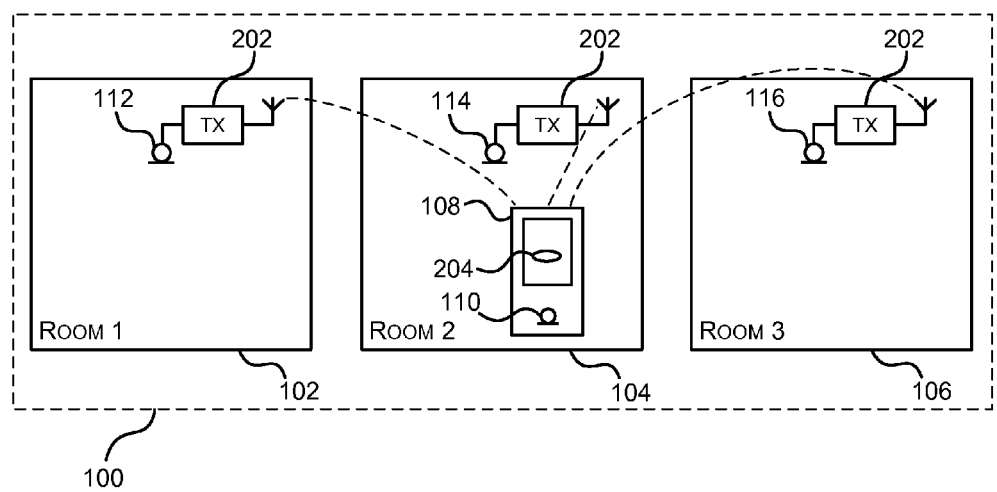
FIG. 2 illustrates a schematic diagram of an indoor positioning system using a mobile device for location calculation relative to fixed microphones.
Figure 3:
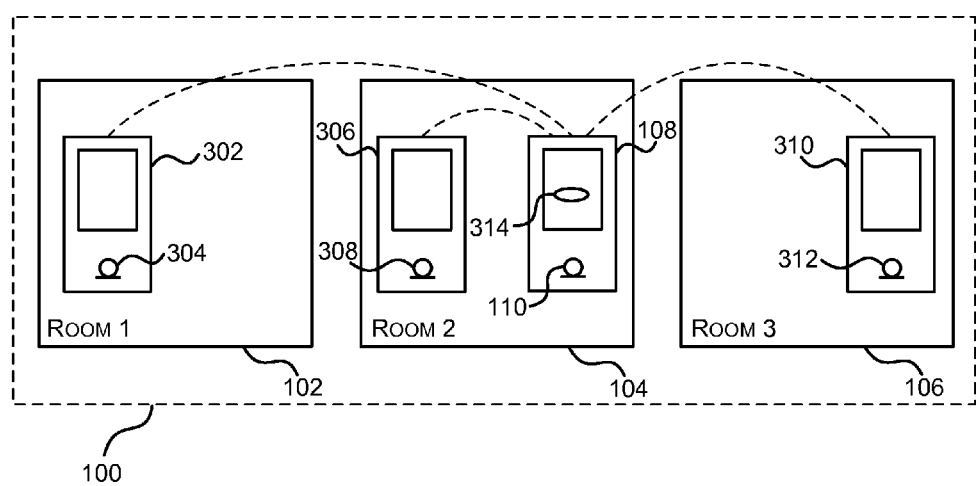
FIG. 3 illustrates a schematic diagram of an indoor positioning system using a mobile device for location calculation relative to other mobile devices.

The techniques described below localize a user by comparing audio signals captured by a mobile microphone associated with the user with audio signals captured by other microphones (which can be fixed or mobile) in order to determine a relative location of the user to the other microphones. FIGS. 1 to 3 below describe three different example positioning systems utilizing this technique, and a method for determining location from the audio signals is described with reference to FIGS. 4 and 5.

Reference is first made to FIG. 1, which illustrates a first example indoor positioning system. FIG. 1 shows a schematic diagram of an indoor positioning system using a central server for location calculation relative to fixed microphones. The example of FIG. 1 illustrates an indoor environment 100 comprising a first room 102, a second room 104 and a third room 106. In other examples a different number of rooms in different configurations can be present in the indoor environment.

A mobile device 108 associated with a user comprises a microphone 110. The microphone 110 is able to capture audio from the vicinity of the user. In the example of FIG. 1, the mobile device 108 is located in the second room 104, and is able to capture audio signals from within this room. In the example of FIG. 1, the mobile device is a mobile telephone. However, in other examples, the mobile device can be a laptop computer, tablet device, or any other type of mobile computing device. In further examples, the mobile device can be a dedicated device for using audio signals for localization.

The system of FIG. 1 aims to determine the location of the mobile device 108 in terms of which room the mobile device is located in. By proxy, this can also be used to estimate the location of the user, as the user is likely to be in the same room as the mobile device.

Each room of the indoor environment 100 comprises a microphone. For example, the first room 102 comprises microphone 112, the second room 104 comprises microphone 114, and the third room 106 comprises microphone 116. In this example, these room microphones are fixed, and associated with predefined locations (e.g. the rooms in which they are placed). The example of FIG. 1 shows one microphone in each room. In alternative examples, rooms or spaces in the indoor environment can comprise more than one microphone. The microphones within the rooms are able to capture ambient noise from within the room. In examples, this can comprise both background noise (e.g. appliances, air conditioning, music etc.) as well as foreground noise (e.g. speech).

In one example, one or more of the room microphones may be dedicated microphones placed in the room for the purposes of determining location. In other examples, one or more of the microphones may already be present in equipment located in the rooms. This may be any fixed device having audio capture capabilities. For example, in the case of an indoor environment that is an office, each room may have conferencing equipment or landline telephones present. Such equipment already comprises microphones able to capture audio from the room.

The indoor positioning system of FIG. 1 further comprises a computing device 118 such as a server. The computing device is executing localizer functionality 120, which is arranged to compare the audio signals from the microphone 110 in the mobile device 108 and the further microphones (112, 114, 116), and determine the location of the mobile device 108. More detail on the operation of the localizer functionality is described with reference to FIGS. 4 and 5 below.

The computing device 118 receives the audio signal from the mobile device 108 via a wireless interface 122. The wireless interface 122 may be located at or in the computing device 118, or remote from it (e.g. connected over a communications network). The wireless interface 122 is arranged to receive signals transmitted from the mobile device 108. These signals can comprise audio information captured by the microphone 110, or data derived therefrom. The user of the mobile device 108 can be prompted to provide consent for the audio signal to be transmitted to the computing device 118. The audio signal received at the wireless interface 122 from the mobile device 108 is provided to the localizer functionality 120 at the computing device 118.

In one example, the wireless interface 122 can be in the form of an access point, and the wireless interface 122 can communicate with the mobile device using any suitable short range communication technique such as WiFi or Bluetooth. In alternative examples, the wireless interface 122 can be in the form of base station, and the wireless interface 122 can communicate with the mobile device using any suitable cellular communication technique such as GSM, GPRS, UMTS, WiMAX or LTE.

The computing device 118 is connected to the room microphones (112, 114, 116) and receives the audio signals from these microphones and provides them to the localizer functionality 120. The computing device 118 may be connected to the room microphones (112, 114, 116) directly or via a communication network. In the example of FIG. 1, the microphones provide an analogue signal directly to the computing device 118, and these are sampled as digital data by an analogue-to-digital converter 124 (ADC). The digital representation of the analogue audio signals from the microphones is then provided to the localizer functionality for processing.

In alternative examples, the microphones can each be provided with individual, local ADCs, such that they each transmit digital audio data to the computing device (either directly or via a network). In further examples, the room microphones can also be wireless, and transmit the audio signals to the computing device 118 wirelessly (e.g. to the wireless interface 122), rather than using a wired connection.

As the computing device 118 (e.g. server) of FIG. 1 receives the audio signals and determines a location for the mobile device 108, the example positioning system of FIG. 1 represents a centralized architecture. The system of FIG. 1 may therefore be suitable for a controlled environment such as a home or office, where the computing device receiving the audio signals is maintained locally. In such scenarios the users can explicitly consent to the capture of ambient audio signals by the microphones.

Reference is now made to FIG. 2, which illustrates a second example positioning system. FIG. 2 shows a schematic diagram of an indoor positioning system using a mobile device for location calculation relative to fixed microphones. Unlike the system of FIG. 1, the system of FIG. 2 does not utilize a central server for location calculation.

FIG. 2 again shows the indoor environment 100 comprising the first room 102, the second room 104, the third room 106, and the mobile device 108 associated with the user. The mobile device 108 again comprises microphone 110, and the first room 102 comprises microphone 112, the second room 104 comprises microphone 114, and the third room 106 comprises microphone 116. As with FIG. 1, the room microphones are fixed and are associated with their respective rooms. Note that in other examples a different number of rooms or microphones in different configurations can be present.

As before, the mobile device microphone 110 is able to capture ambient audio from the vicinity of the user, and the room microphones are able to capture ambient audio from within their rooms. The system of FIG. 2 aims to determine the location of the mobile device 108 in terms of which room the mobile device is located in.

Rather than communicating with a central computing device, in the example of FIG. 2, the room microphones (112, 114, 116) are each connected to a transmitter 202, and the transmitter communicates with the mobile device 108. In this configuration, the room microphones each transmit their audio signals directly to the mobile device 108. For example, the room microphones may transmit their audio signals using a short range wireless communication technique such as WiFi or Bluetooth. A corresponding receiver arranged to receive the audio signals from the transmitters 202 is present at the mobile device 108.

In alternative examples, rather than using a separate transmitter 202 for each microphone, the microphones can be connected to a common transmitter or access point that transmits the audio signals for a plurality of microphones.

In the example of FIG. 2, the mobile device 108 executes the localizer functionality 204. The localizer functionality 204 is similar to that described above with reference to FIG. 1, and is described below in more detail with reference to FIGS. 4 and 5. The localizer functionality 204 receives the audio signal from the microphone 110 in the mobile device 108 that describes the ambient noise in the vicinity of the mobile device 108. The localizer functionality 204 also receives the audio signals from each of the room microphones 112, 114, 116 that describe the ambient noise in the vicinity of the each of the rooms of the indoor environment 100. The localizer functionality 204 then compares these audio signals (as described below) to determine the location of the mobile device.

Therefore, the system of FIG. 2 enables the determination of the location of the mobile device 108 in the indoor environment (in terms of which room it is located in). This is achieved without the use of a central server, as the processing for the localization functionality is performed at the mobile device 108. This means that the audio signal from the mobile device microphone 110 is not transmitted outside the mobile device 108, which may be useful in scenarios that are not under the control of the user (e.g. not in a home/office environment), although user consent can again be obtained prior to audio capture.

Reference is now made to FIG. 3, which illustrates a third example positioning system. FIG. 3 shows a schematic diagram of an indoor positioning system that calculates location relative to other mobile devices. The system of FIG. 3 differs from those in FIG. 1 or 2 in that the system is not aiming to determine the location of the mobile device 108 in terms of which room of an indoor environment the mobile device is in, but rather the system aims to determine which other mobile devices it is in proximity to.

The use of acoustic signals for this purpose enables a more representative location to be determined for indoor environments. For example, low power radio signals can be transmitted between mobile devices to ascertain whether they are in proximity. However, these signals pass readily through walls, floors, windows, and other internal structures in indoor environments. Therefore, when radio signals are used it may appear that certain mobile devices are in proximity, whereas they are actually in different rooms or on different floors. This results in a difference between what the user perceives as being other mobile devices in proximity, and what the positioning system determines. Acoustic signals are more readily attenuated by indoor structures, and are therefore suitable for determining proximity between mobile devices that matches the user's perception.

FIG. 3 again shows the indoor environment 100 comprising the first room 102, the second room 104, the third room 106, and the mobile device 108 associated with the user. The mobile device 108 again comprises microphone 110 that is able to capture ambient audio from the vicinity of the user. However, fixed room microphones are not present.

The example of FIG. 3 includes three further mobile devices: a first further mobile device 302 comprising microphone 304; a second further mobile device 306 comprising microphone 308; and a third further mobile device 310 comprising microphone 312. Each of these further mobile devices 302, 306, 310 can communicate with the mobile device 108 of the user. For example, the further mobile devices 302, 306, 310 may communicate with the mobile device 108 using a short range wireless communication technology such as WiFi, Bluetooth or similar. The further mobile devices 302, 306, 310 transmit audio signals from their respective microphones 304, 308, 312 to the mobile device 108, at the consent of the associated user. These audio signals contain information on the ambient audio in the vicinity of the associated further mobile device.

In the FIG. 3 example, the mobile device 108 executes localizer functionality 314. The localizer functionality 314 is similar to that described above with reference to FIGS. 1 and 2 (and described below in more detail with reference to FIGS. 4 and 5). The localizer functionality 314 receives the audio signal from the microphone 110 in the mobile device 108 that describes the ambient noise in the vicinity of the mobile device 108. The localizer functionality 314 also receives the audio signals from each of the microphones 304, 308, 312 that describe the ambient noise in the vicinity of the each of the further mobile devices 302, 306, 310. The localizer functionality 314 then compares these audio signals (as described in more below) to determine the relative location of the mobile device.

In the illustrative example of FIG. 3, the mobile device 108 is present in the second room 104. Also present in the second room 104 is the second further mobile device 306. When the mobile device 108 compares the audio signal from its own microphone 110 with that from the microphone 308 of the second further mobile device 306 it can determine that these are sufficiently similar to indicate that the mobile device 108 is close to (e.g. in the same room as) the second further mobile device 306.

Conversely, in the example of FIG. 3, the first further mobile device 302 and third further mobile device 310 are located in different rooms to the mobile device 108. They are still sufficiently close to the mobile device 108 that the radio signals comprising the audio from the first further mobile device 302 and third further mobile device 310 are received at the mobile device 108. However, because they are located in different rooms to the mobile device 108, the audio signals from the first further mobile device 302 and third further mobile device 310 are different from the audio captured by the mobile device microphone 110. The localizer functionality 314 therefore does not consider the mobile device 108 to be in close proximity to the first further mobile device 302 and third further mobile device 310.

This matches the user's perception of the relative spatial locations of the mobile devices. The user perceives that the second further mobile device 306 is close by, as it is in the same room, but does not consider the first further mobile device 302 or third further mobile device 310 to be close as they are in a different room and cannot be seen (despite the fact that they may be spatially nearby).

The system of FIG. 3 does not provide an absolute location for the mobile device 108 in an indoor environment, but does provide a relative location between mobile devices. In other words, the positioning system of FIG. 3 determines which mobile devices are in sufficiently close proximity to experience similar ambient noises (e.g. in the same room). This relative location information can be used to provide location based services such as sharing of documents or presentation materials with participants of a meeting that are all in the same room, without sharing with other mobile devices that are outside the room.

In some examples, to avoid sharing audio signals with unknown mobile devices, each mobile device can be arranged to only send an audio signal to another mobile device if the user has expressly permitted the communication, or if the other mobile device is pre-approved, e.g. by listing the other mobile device in its address book.

In an alternative example to that shown in FIG. 3, a centralized architecture using a server can be used, similar to that shown in FIG. 1. In such an example, each of the mobile devices 108, 302, 306, 310 transmits their audio signals to a computing device such as a server, which executes the localizer functionality and determines the relative locations.

Systems such as that shown in FIG. 3, in which mobile devices compare audio signals can be used to generate a relative topography for a group of users of mobile devices. For example, each mobile device can use the audio signals to determine which other mobile devices it is in proximity to. This information can be collated and used to generate an overall topography for all users, indicating who is near who.

Note that in further examples, combinations of fixed and mobile microphones can also be used. For example, the examples of FIGS. 2 and 3 can be combined, such that some or all rooms have fixed microphones, and the further mobile devices also send their audio signals to the mobile device 108. This enables determination of both absolute and relative locations of the mobile device 108.

Figure 4:
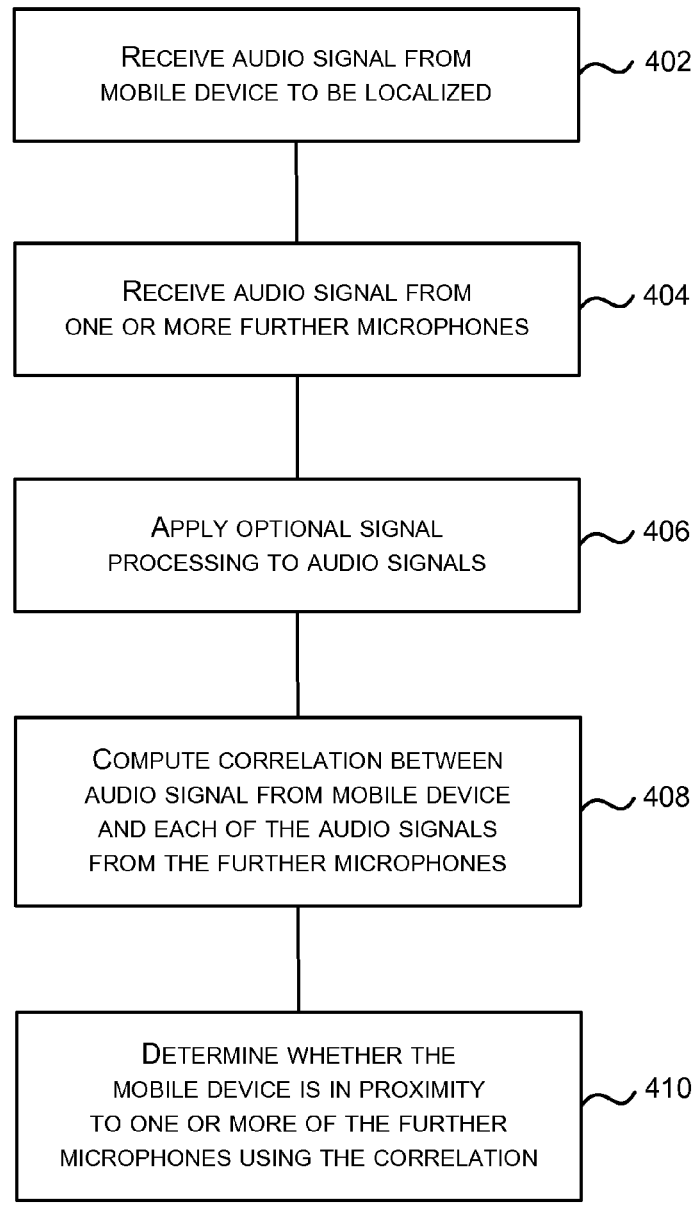
FIG. 4 illustrates a flow chart of a process for determining a location of a mobile device using audio signals.

Reference is now made to FIG. 4, which illustrates a flow chart of a process for determining a location of a mobile device using audio signals. The process of FIG. 4 can be implemented by the localizer functionality 120, 204, 314 as mentioned above with reference to FIGS. 1, 2 and 3, located at the mobile device 108 or computing device 118. The process of FIG. 4 may be implemented in software, hardware, firmware, or any suitable combination thereof, as described in more detail with reference to FIG. 5 below.

The audio signal from the mobile device 108 to be localized is received 402. This audio signal originates from the microphone 110 in the mobile device 108 as described above. The audio signal received can be in the form of digital samples of the analogue audio signal captured by the microphone 110. The audio signals from one or more further microphones are also received 404. These audio signals are those received from, for example, the fixed room microphones 112, 114, 116 in the examples of FIGS. 1 and 2, or the mobile device microphones 304, 308, 312 in the example of FIG. 3. These audio signals can be in the form of digital samples of the captured analogue audio.

Optional signal processing can then be applied 406 to either or both of the audio signals from the mobile device 108 and the further microphones. The signal processing that can be applied includes (but is not limited to) one or more of encryption, audio fingerprinting, filtering, normalization, time-shifting, and domain transformation.

An encryption operation can be used to ensure that ambient audio signals captured by the microphones cannot readily be intercepted during transmission between elements of the localization system. In some examples, encryption can be performed locally at the microphones, such that only secure audio signals are transmitted (wired or wirelessly) from the microphones.

For example, an audio fingerprinting operation can determine a "signature" for each audio signal. This is also known as content-based audio identification (CBID). Audio fingerprinting operations extract representative features from the audio signals. The audio fingerprint therefore characterizes the audio signal without retaining the information content (e.g. any captured speech) within the signal. If an audio fingerprint operation is used, then the signatures of the audio signals can be compared, rather than the original captured audio. Examples of features that can be extracted from audio signals in an audio fingerprinting operation include (but are not limited to): Mel-frequency cepstrum coefficients (MFCC); spectral flatness measures (SFM); band representative vectors; and hash strings. Note that, in some examples, the audio fingerprinting operation can be performed locally at the microphones, to ensure that only signals without information content are sent from the microphones.

In examples, filtering operations can be applied to one or more of the audio signals to filter one or more frequency bands. Selecting certain frequency bands of the audio signal to retain can be used to enhance the audio signals by focusing the analysis on representative frequency bands that characterize locations. For example, a high-pass filter can be used to remove low frequency portions of the signal that may propagate more easily through internal building structures, leaving higher frequency signals that do not pass between rooms readily. In another example, band-pass filters can be used to remove frequency bands associated with human speech, such that mainly background noise is retained in the audio signals.

In other examples, the filtering performed can be based on amplitude, i.e. volume level, of the audio signals. For example, only the portions of the audio signals that are less than a selected amplitude can be retained by the filters. This enables foreground audio to be removed from the audio signals, and only background audio signals are retained.

In further examples, a normalization operation can be performed on the audio signals. A normalization operation can equalize the amplitude of the different audio signals. For example, this can normalize the peak level or a mean level (e.g. RMS) of the audio signals. The normalization can, in other examples, also (or additionally) be performed in the frequency domain, such that the frequency range of the audio signals is equalized.

A time-shift operation can be applied to the audio signals in yet further examples. The time-shift can be used to more accurately align (i.e. synchronize) the samples of the audio signals originating from different sources. For example, in the case of FIG. 1, the fixed room microphones are shown providing their audio signals to the computing device via direct wired connections. This therefore results in these audio signals arriving with minimal time-lag. However, the audio signals from the microphone 110 in the mobile device 108 are sent over a wireless link. The processing involved in coding, transmitting and subsequently receiving and decoding the audio signals over the wireless link introduces a time-lag for this audio signal, relative to the others received more directly. To counteract such time differences, a time shift can be applied to one or more of the audio signals (e.g. the audio signals from the fixed room microphones), such that the audio signals are time-aligned.

A domain transformation operation can be applied in some examples to transform the audio signals from the time-domain to the frequency domain. The audio signals are then subsequently compared in the frequency domain rather than time domain. By processing the audio signals in the frequency domain, information such as speech in the audio signals is not directly derivable. A transformation from the time-domain to the frequency-domain can be performed using, for example, a fast Fourier transform.

Note that some or all of these signal processing operations can also be performed locally at the microphones, as well as at the localizer functionality.

Following the optional signal processing operations, the various audio signals are compared. To do this, a correlation between the audio signal from the mobile device 108 and the audio signals from each of the further microphones is computed 408. In one example, the correlation calculation can be in the form of a cross-correlation calculation. For example, the cross-correlation between two functions (e.g. audio signals), f and g, can be found using the following definition:

$$(f \star g)[n] \stackrel{def}{=} \sum_{m=-\infty}^{\infty} f^*[m]g[n+m]$$

Where n is a time lag between the two functions, and f* is the complex conjugate of f.

The output of the correlation calculations is a set of values that indicates the degree of similarity between the audio signal from the mobile device 108 and the audio signals from each of the further microphones. The set of correlation values are then compared to determine 410 which of the further microphones the mobile device is in proximity to. This can be achieved by selecting the further microphone providing the audio signal that has the highest degree of correlation with the audio signal from the mobile device. In a further example, a threshold correlation value can also be set, such that the mobile device is determined to be in proximity to one or more further microphones for which the degree of correlation exceeds the threshold.

Even in an example where multiple further microphones are present in a single room, the correlation will be greatest for the further microphone that is closest to the mobile device. This is because the ambient noise can vary even within the confines of a single room. Therefore, this technique can also be used to provide localization within a single room environment.

The determined location in terms of a relative proximity to one of the further microphones can then be output from the localizer functionality and utilized in any suitable location based services. As noted above, the output location can be transformed into an absolute location in the case of fixed microphones, as the location (e.g. in terms of rooms) of the fixed microphones is known. Alternatively, the output location can be in the form of a relative location in the case of mobile microphones, for example in terms of a proximity to one or more other mobile devices.

Figure 5:
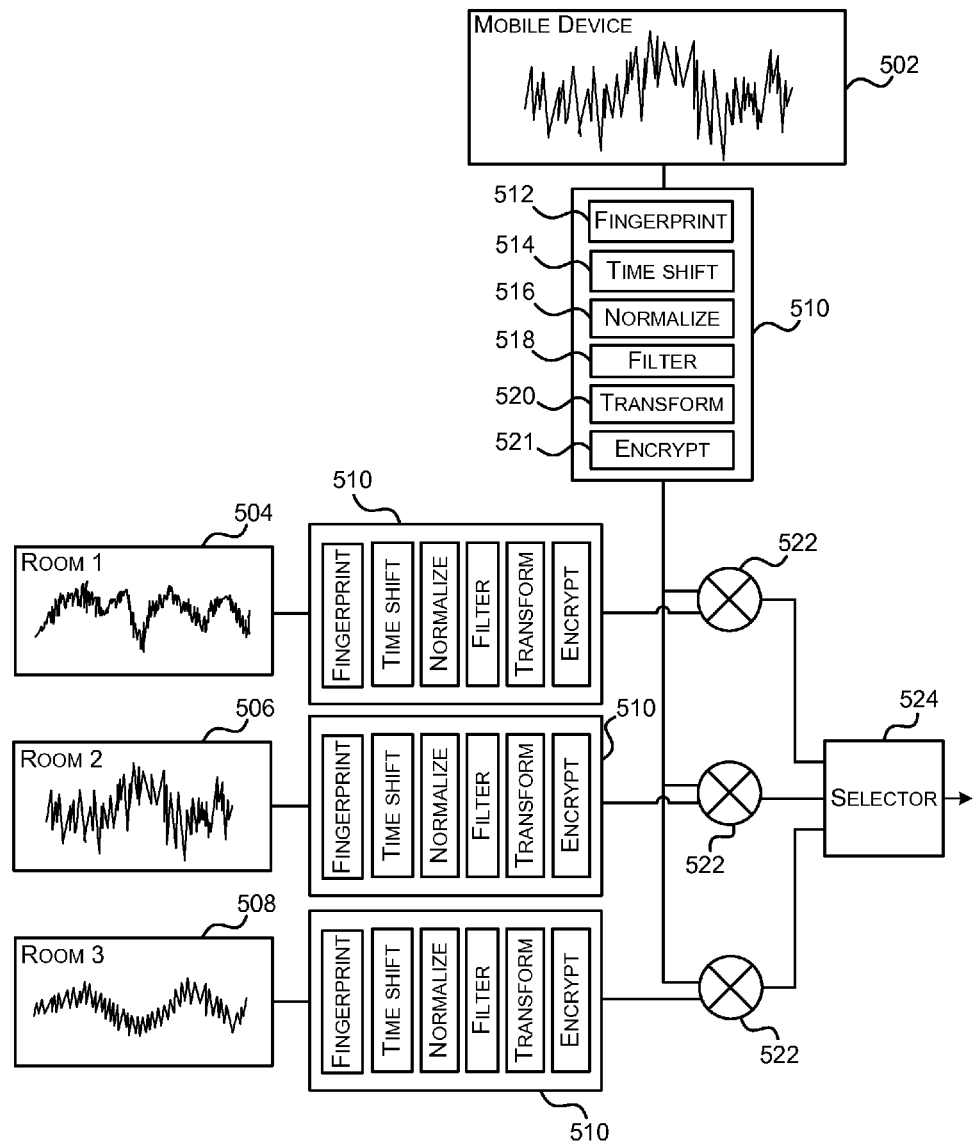
FIG. 5 illustrates a functional block diagram of an indoor localizer.

Reference is now made to FIG. 5, which illustrates a functional block diagram of the localizer functionality implementing the flowchart of FIG. 4. FIG. 5 is illustrated in the context of the example system of FIGS. 1 and 2, with fixed microphones. Note that a similar structure also applies when the audio signals are received from other mobile devices rather than the fixed microphones (e.g. in the case of FIG. 3).

FIG. 5 shows an audio signal 502 captured by the mobile device 108. FIG. 5 also shows an audio signal 504 captured by the microphone 112 in the first room 102, an audio signal 506 captured by the microphone 114 in the second room 104, and an audio signal 508 captured by the microphone 116 in the first room 106.

Each of the audio signals 502, 504, 506, 508 can be in the form of digital samples of ambient sounds from a short period of time. In some examples, the time period over which the sound is sampled can be sufficiently short that no significant information content can be obtained from any speech that is captured by the microphones.

The audio signals 502, 504, 506, 508 are then each provided to optional signal processing blocks 510, which can apply one or more of the signal processing operations described above. These include (but are not limited to) an audio fingerprint operation 512, a time-shift operation 514, a normalize operation 516, a filter operation 518, a domain transform operation 520, and an encryption operation 521.

Following signal processing (if applied), each audio signal 504, 506, 508 from the rooms are separately applied to one input of a correlator 522. The audio signal 502 from the mobile device 108 is applied to the other input of each correlator 522. The correlator 522 outputs the correlation between the signals applied at its inputs. The output from each correlator 522 is provided to a selector 524. The selector 524 compares the correlation between the mobile device audio signal 502 and each of the room audio signals 504, 506, 508, and outputs the room having the highest degree of correlation as the location for the mobile device 108.

Figure 6:
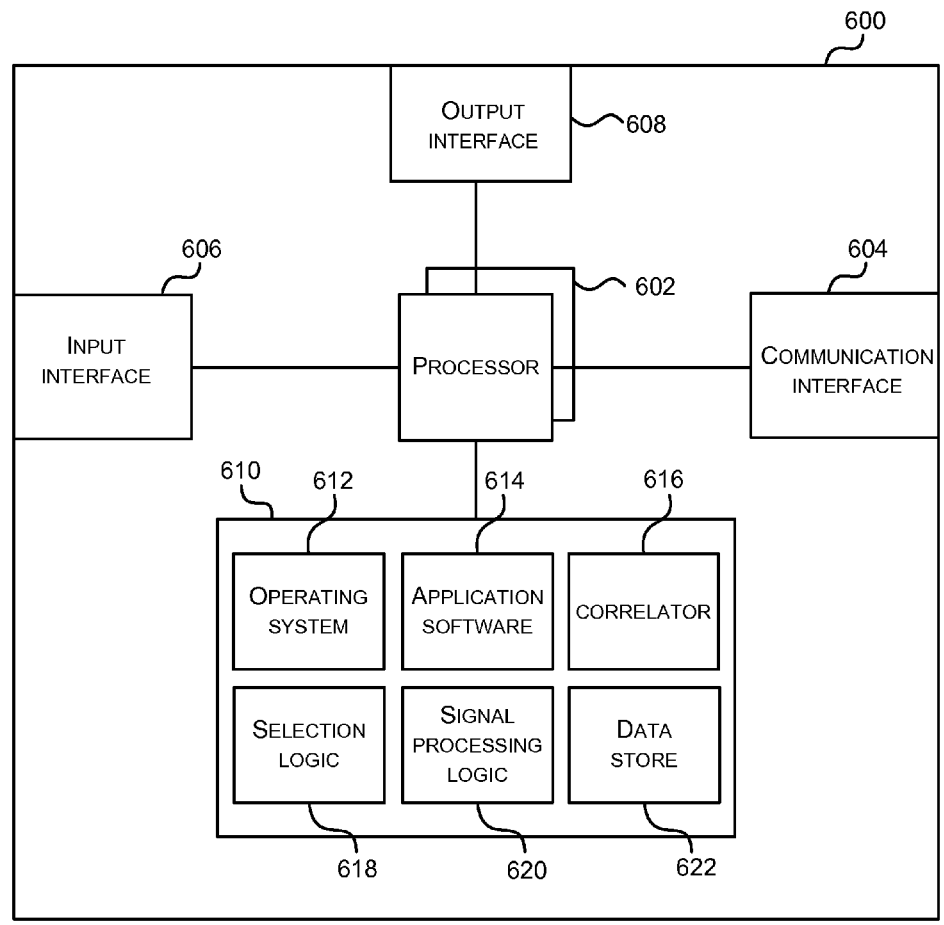
FIG. 6 illustrates an exemplary computing-based device in which embodiments of the mobile device localization technique may be implemented.

Reference is now made to FIG. 6, which illustrates various components of an exemplary computing device 600 which may be implemented as any form of a computing and/or electronic device, and in which embodiments of the indoor localization technique may be implemented. For example, the computing device 600 of FIG. 6 can be the centralized computing device 118 of FIG. 1, or the mobile device 108 of FIG. 2 or 3.

Computing device 600 comprises one or more processors 602 which may be microprocessors, controllers or any other suitable type of processors for processing computing executable instructions to control the operation of the device in order to perform indoor localization. In some examples, for example where a system on a chip architecture is used, the processors 602 may include one or more fixed function blocks (also referred to as accelerators) which implement a part of the indoor localization methods in hardware (rather than software or firmware).

The computing device 600 comprises a communication interface 604, which is arranged to communicate with one or more communication networks. For example, the communication interface can be a wireless communication interface arranged to communicate wirelessly with one or more mobile devices or microphones (e.g. as shown in FIG. 1-3). The communication interface may also communicate with one or more wired communication networks (e.g. the internet).

The computing device 600 also comprises an input interface 606 arranged to receive input from one or more devices or data sources, such as the microphones 112, 114, 116 as shown in of FIG. 1. An output interface 608 may also optionally be provided and arranged to provide output to, for example, a storage device or display system integral with or in communication with the computing device. The display system may provide a graphical user interface, or other user interface of any suitable type although this is not essential.

The computer executable instructions may be provided using any computer-readable media that is accessible by computing device 600. Computer-readable media may include, for example, computer storage media such as memory 610 and communications media. Computer storage media, such as memory 610, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 610) is shown within the computing device 600 it will be appreciated that the storage may be distributed or located remotely and accessed via a network or other communication link (e.g. using communication interface 604).

Platform software comprising an operating system 612 or any other suitable platform software may be provided at the computing device to enable application software 614 to be executed on the device. The memory 610 can store executable instructions to implement the functionality of a correlator 816 for comparing audio signals, selection logic 618 for comparing correlation values and determining a location, and optional signal processing logic 620 for implementing the signal processing operations described above. The memory 610 can also provide a data store 622, which can be used to provide storage for data used by the processors 602 when performing the indoor localization techniques.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of localizing a mobile device, comprising:
   receiving, at a processor, a first audio signal captured by a microphone located at the mobile device;
   receiving, at the processor, a second audio signal captured from a further microphone;
   computing a correlation value for the first audio signal and second audio signal; and
   determining whether the mobile device is in proximity to the further microphone using the correlation value.

2. A method according claim 1, wherein the step of computing the correlation value comprises calculating a cross-correlation between the first audio signal and second audio signal.

3. A method according to claim 1, wherein the first audio signal comprises ambient noise from the vicinity of the mobile device, and the second audio signal comprises ambient noise from the vicinity of the further microphone.

4. A method according to claim 1, wherein the further microphone is non-mobile and is associated with a predefined location.

5. A method according to claim 4, wherein the predefined location is a room of an indoor environment.

6. A method according to claim 4, wherein the processor is located at a server, and wherein the step of receiving the first audio signal comprises receiving the first audio signal via a wireless interface, and the step of receiving the second audio signal comprises receiving the second audio signal via and analog-to-digital converter.

7. A method according to claim 4, wherein the processor is located at the mobile device, and wherein the step of receiving the second audio signal comprises receiving the second audio signal via a wireless communication interface at the mobile device.

8. A method according to claim 1, wherein the processor is located at the mobile device, and the further microphone is located in a further mobile device, such that the step of determining determines whether the mobile device is in proximity to the further mobile device.

9. A method according to claim 1, further comprising the steps of: receiving, at the processor, a third audio signal captured from an additional microphone; and
   computing a further correlation value for the first audio signal and third audio signal.

10. A method according to claim 9, further comprising the step of comparing the correlation value and the further correlation value, and wherein the step of determining comprises determining that the mobile device is in proximity to the further microphone if the second audio signal has a higher degree of correlation with the first audio signal than the third audio signal.

11. A method according to claim 1, further comprising the step of determining an audio fingerprint for the first and second audio signals prior to computing the correlation.

12. A method according to claim 1, further comprising the step of at least one of normalizing and filtering at least one of the first and second audio signals prior to computing the correlation.

13. A method according to claim 1, further comprising the step of transforming the first and second audio signals into frequency domain signals prior to computing the correlation.

14. A method according to claim 1, further comprising the step of applying a time-shift to at least one of the first and second audio signals prior to computing the correlation.

15. A mobile device, comprising:
   a microphone arranged to capture a first audio signal from the vicinity of the mobile device;
   a communication interface arranged to receive a second audio signal captured from a further microphone;
   a processor connected to the microphone and the communication interface, and arranged to compute a correlation value for the first audio signal and second audio signal, and determine whether the mobile device is in proximity to the further microphone using the correlation value.

16. A mobile device according to claim 15, wherein the further microphone is located at a further mobile device, and the processor is arranged to determine whether the mobile device is in proximity to the further mobile device.

17. A method according to claim 1, wherein the further microphone is non-mobile and is associated with a predefined location, and the processor is arranged to determine whether the mobile device is in proximity to the predefined location.

18. A mobile device according to claim 15, wherein the mobile device is a mobile telephone or laptop computer.

19. An indoor positioning system, comprising:
   a plurality of fixed microphones, each located in a different room of an indoor environment, and each arranged to capture audio signals from its respective room;
   a wireless interface arranged to receive an audio signal from a mobile device having a microphone arranged to capture the audio signal from the vicinity of the mobile device; and
   a computing device connected to the plurality of fixed microphones and the wireless interface, and arranged to receive each of the fixed microphone audio signals and the mobile device audio signal, compute a correlation between the mobile device audio signal and each of the fixed microphone audio signals, determine a selected fixed microphone providing the audio signal having the highest degree of correlation with the mobile device audio signal, and outputting the room associated with the selected fixed microphone as the mobile device location.

20. An indoor positioning system according to claim 19, wherein at least one of the plurality of fixed microphones is located in a landline telephone or telephone conferencing device.

* * * * *